May 15, 1934.  V. J. CHAPMAN  1,959,194

ELECTRODE NOZZLE

Filed Aug. 24, 1933

Inventor:
Verni J. Chapman,
by Harry E. Dunham
His Attorney.

Patented May 15, 1934

1,959,194

UNITED STATES PATENT OFFICE 1,959,194

ELECTRODE NOZZLE

Verni J. Chapman, Schenectady, N. Y., assignor to General Electric Company, a corporation of New York Application August 24, 1933, Serial No. 686,550

8 Claims. (Cl. 219—8)

My invention relates to arc welding.

It is an object of my invention to provide an electrode delivery member or nozzle of improved construction.

Figure 1:
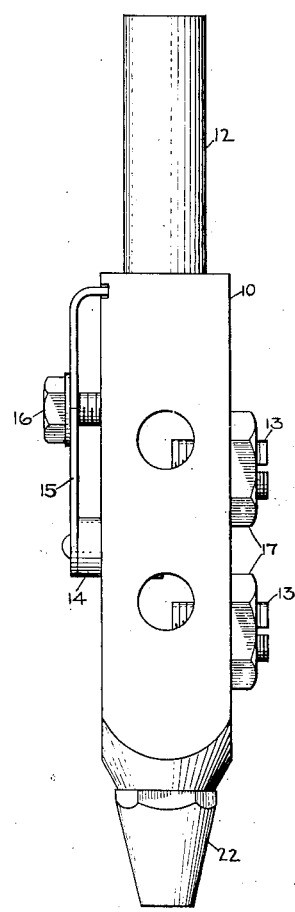
Figure 2:
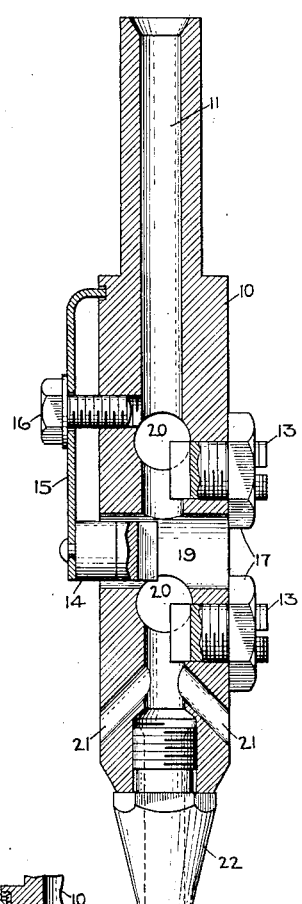
Figure 3:
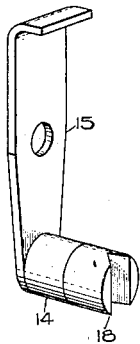
Figure 4:
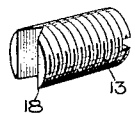
Figure 5:
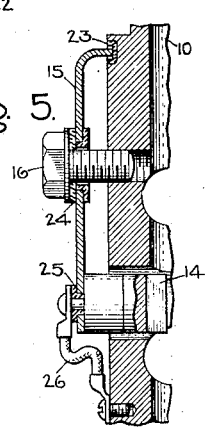

My invention will be better understood from the following description taken in connection with the accompanying drawing, Figs. 1 and 2 of which are side and longitudinal sectional views of a nozzle embodying my invention, Figs. 3 and 4 of which are perspective views of the contact members employed in the nozzle illustrated in Figs. 1 and 2, and Fig. 5 of which is a sectional view of a modification in which the pressure spring of a contact member is electrically insulated from the nozzle.

The nozzle 10 shown in the drawing forms part of an automatic or semi-automatic welding machine by means of which an electrode is fed toward the work during the welding operation. It is provided with a longitudinal passageway 11 through which the electrode moves in its passage to the work. The nozzle illustrated is suported in the apparatus of which it forms a part by a shank 12 which is clamped therein by means which may also serve for supplying welding current to the nozzle.

In passing through the nozzle 10 the electrode engages contacts 13 and 14. Contacts 13 are adjustably supported in the nozzle 10 and contact 14 is biased into engagement with the electrode by means of a spring 15 the tension of which may be adjusted by means of a screw 16. In the particular arrangement illustrated the contacts 13 are screws which are threaded into openings in the electrode and clamped in adjusted position relative thereto by nuts 17. The electrode engaging portions of the contacts 13 and 14 are provided with a suitable wear-resisting material 18. The material described in Patent No. 1,552,184, Nathan H. Adams, September 1, 1925, has been found suitable for this purpose. It will be noted that in the particular arrangement illustrated the electrode engaging portions of the contacts have been grooved in order positively to engage the electrode as it is fed through the nozzle.

The contact 14 is located in an opening 19 extending through the nozzle between contacts 13 and intersecting the passageway 11. By adopting this construction contacts 13 and 14 are spaced from one another along the length of the nozzle so that contacts 13 are beyond the path of movement of contact 14, and these contacts can never come together no matter how badly worn their surface becomes by reason of the abrading action of the electrode thereon.

Electrodes often have or are provided with surface coatings which are more or less readily separated therefrom when brought into frictional engagement with contact members such as those disclosed in the nozzle above described. In order to discharge the coating material dislodged from the electrode in its passage through the nozzle, openings 20 are provided which extend into the passageway 11 at contacts 13. The opening 19 into which the contact 14 extends also acts as a discharge opening for surface material removed from the electrode by engagement of contact 14 therewith. Additional openings 21 are also provided near the lower portion of the nozzle for discharging surface material which has not been discharged through the openings 19 and 20. Very little material separated from the electrode in its passage through the nozzle will fall through the tip 22 of the nozzle through which the electrode is delivered to the work. The tip 22 has been illustrated as detachable from the nozzle. This construction is employed so that the tips of various sizes may be used for electrodes of different sizes and so that a new tip may be supplied when the old tip becomes badly worn through use.

A nozzle of the construction above illustrated may by proper adjustment of the contacts 13 and 14 and by the use of suitable tips 22 be employed for feeding electrodes of varying size. The arrangement of parts is such that good electrical contact is established between the nozzle and the electrode fed therethrough through the agency of contacts which are renewable and readily adjusted relative to one another to compensate for wear or variations in the size of the electrode material employed.

In the particular nozzle illustrated and described above, current is supplied to the contacts through the body of the nozzle which is made of metal. Very little current will be supplied to the contact 14 through the spring 15 and, in some cases, it may be desirable to prohibit the flow of current through spring 15. This may be accomplished by suitably insulating the spring or its contact from the nozzle at its points of engagement therewith, or by using a contact of electrically non-conducting material. In Fig. 5 of the drawing I have illustrated a construction in which the spring 15 is insulated from the nozzle 10 at 23, 24 and 25. The contact 14 is electrically connected to the nozzle 10 by means of a flexible connection 26. It is, of course, within the scope of my invention to make the body of the nozzle of electrically non-conducting material and to supply the welding current directly to one or all of the contacts. For small electrodes it is only necessary that one of the contacts be electrically connected to the source of welding current. When using heavier currents and larger diameter electrodes, it is desirable to have a plurality of contacts carry the welding current in order to reduce the heating effect at each contact.

While I have shown and described but one embodiment of my invention, it will be understood that other embodiments will occur to those skilled in the art, and I therefore wish to cover by the following claims all modifications of my invention which fall within the true spirit and scope of my invention.

What I claim as new and desire to secure by Letters Patent of the United States, is:

1. An electrode delivery nozzle for supplying current to an electrode as it is fed toward the work comprising a plurality of contacts spaced from one another along the length of said electrode a sufficient distance to prevent their engagement with one another, means for biasing said contacts toward one another into engagement with said electrode, and means for supplying welding current to at least one of said contacts.

2. An electrode delivery member for supplying current to an electrode as it is fed toward the work comprising a sliding contact, means for biasing said contact into engagement with said electrode, cooperating contacts disposed on opposite sides of and beyond the path of movement of said first-mentioned contact, and means for supplying welding current to at least one of said contacts.

3. A nozzle having an electrode delivery passageway therein, electrode engaging contacts projecting into said passageway, and openings extending into said passageway at said contacts, said openings being large enough to discharge the coating material dislodged from said electrode in passing through said nozzle.

4. A nozzle having an electrode delivery passageway therein, a plurality of electrode engaging contacts extending into said passageway, openings extending into said passageway at said contacts, another opening between said contacts and intersecting said passageway, another electrode engaging contact located in said opening, means for biasing said last-mentioned contact toward said adjustable contacts, and means for supplying welding current to said electrode through at least one of said contacts.

5. A nozzle having an electrode delivery passageway therein, a plurality of electrode engaging contacts extending into said passageway, means for independently adjusting said contacts, openings extending into said passageway at said contacts, another opening between said contacts and intersecting said passageway, another electrode engaging contact located in said opening, means for biasing said last-mentioned contact toward said adjustable contacts, and means for supplying welding current to said electrode through at least one of said contacts.

6. A metallic nozzle having an electrode delivery passageway therein, a plurality of metallic contacts electrically connected to said nozzle and extending into said passageway, means for independently adjusting said contacts, openings extending into said passageway at said contacts, another opening between said contacts and intersecting said passageway, another contact located in said opening, and means for biasing said last-mentioned contact toward said adjustable contacts.

7. A metallic nozzle having an electrode delivery passageway therein, a plurality of metallic contacts electrically connected to said nozzle and extending into said passageway, an opening between said contacts and intersecting said passageway, another metallic contact located in said opening, means including a spring for biasing said last-mentioned contact toward said first-mentioned contacts, and means for electrically insulating said spring from said nozzle.

8. A metallic nozzle having an electrode delivery passageway therein, a plurality of metallic contacts electrically connected to said nozzle and extending into said passageway, an opening between said contacts and intersecting said passageway, another metallic contact located in said opening, means including a spring for biasing said last-mentioned contact toward said first-mentioned contacts, means for electrically insulating said spring from said nozzle and a flexible electrical connection between said last-mentioned contact and said nozzle.

VERNI J. CHAPMAN.